United States Patent [19]

Vandeputte

[11] Patent Number: 4,841,963

[45] Date of Patent: Jun. 27, 1989

[54] ACCESSORY FOR GAS MASKS AND GAS MASKS EQUIPPED THEREWITH

[75] Inventor: Gilbert Vandeputte, Berchem, Belgium

[73] Assignee: Engicom Naamloze Vennootschap, Brussels, Belgium

[21] Appl. No.: 94,305

[22] Filed: Sep. 4, 1987

[30] Foreign Application Priority Data

Sep. 8, 1986 [BE] Belgium ............................. 2/61046

[51] Int. Cl.[4] ............................................. B62B 18/00

[52] U.S. Cl. ........................... 128/202.15; 128/206.22

[58] Field of Search ....................... 128/202.15, 206.22

[56] References Cited

U.S. PATENT DOCUMENTS

| | | | |
|---|---|---|---|
| 1,366,437 | 1/1921 | Wagenhorst . | |
| 2,023,267 | 12/1935 | De Saint Rapt et al. ...... | 128/202.15 |
| 2,133,345 | 10/1938 | Davis . | |
| 3,042,033 | 7/1962 | Early et al. . | |
| 3,067,425 | 12/1962 | Colley ....................... | 128/202.15 X |
| 3,348,537 | 10/1967 | Miller et al. . | |
| 3,359,568 | 12/1967 | Kothe ......................... | 128/202.15 X |
| 4,524,951 | 6/1985 | Green et al. ............... | 137/625.25 X |

FOREIGN PATENT DOCUMENTS

| | | | |
|---|---|---|---|
| 687036 | 3/1934 | Fed. Rep. of Germany . | |
| 2321607 | 11/1974 | Fed. Rep. of Germany ....................... | 128/202.15 |
| 811036 | 12/1935 | France . | |
| 837355 | 7/1958 | United Kingdom . | |

*Primary Examiner*—Gerald A. Michalsky
*Attorney, Agent, or Firm*—Michael N. Meller

[57] ABSTRACT

A gas mask and accessory therefor having the capability to connect the inside with the outside environment in both the intake of food and the removal of perspiration. The accessory has a slide valve that is biased closed, an elastic drinking straw gripping sealer, and, an ability to position the accessory behind the gas mask filter.

8 Claims, 3 Drawing Sheets

Fig.1
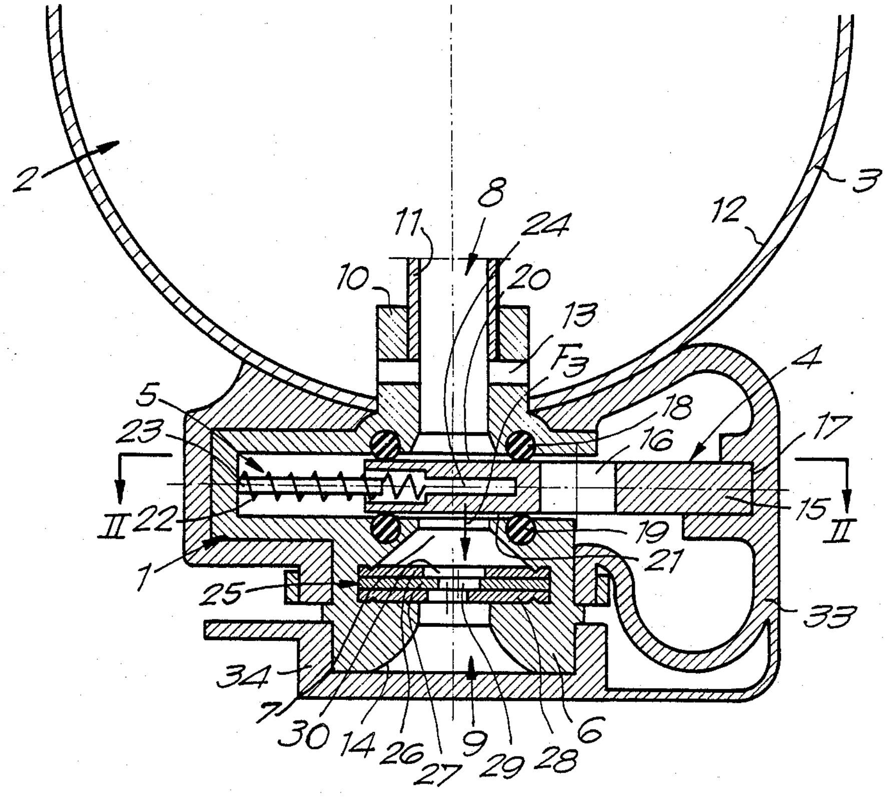
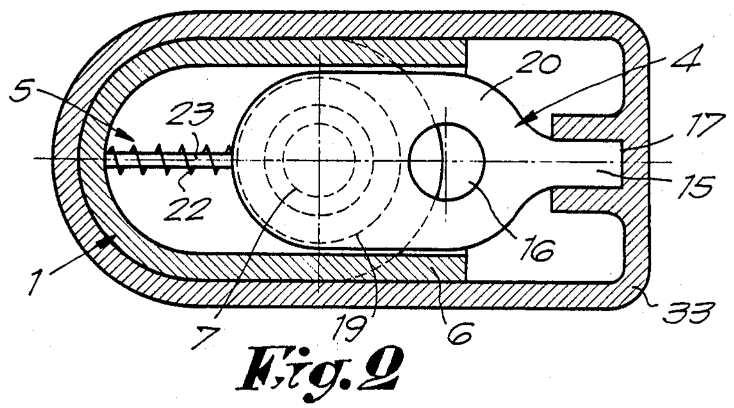
Fig.2

ACCESSORY FOR GAS MASKS AND GAS MASKS EQUIPPED THEREWITH

This invention relates to an accessory for gas masks, especially an accessory that allows one to provide for the supply of food and/or the drainage of perspiration when wearing the gas mask.

This invention also relates to gas masks that are equipped with the above-mentioned accessory.

In the prior art the use of connecting pieces in gas mask have been employed in such a way that it is possible to take food from a food receptacle. On the one hand, such connecting pieces are connected to the gas mask and on the other hand are provided with means that can be connected to the food receptacle. Such a system is cumbersome and cannot be applied universally.

When a gas mask of the prior art is used, perspiration is drained either by lifting the bottom of the gas mask from the face very shortly, which caanot be done in a highly toxic atmosphere, or by placing the exhalation valve at the lowest part of the mask, whereby the drainage of perspiration occurs automatically and uncontrolled. In some cases, e.g. when working at electric apparatus, this may lead to dangerous situations.

Accordingly, this invention relates to a gas mask and especially to an accessory that is used therein, whereby the above-mentioned and other disadvantages of the known gas masks can be excluded systematically. For that purpose, the invention provides an accessory for gas masks that offers a closeable passage between the inside of the mask and the outside environment. By opening this passage, a straw or the like can be placed in it by means of which a beverage or liquid food can be taken from any receptacle. According to a preferred embodiment said accessory is fixed to the underside of the gas mask so that by opening the above-mentioned passage it is also achieved that the perspiration contained in the mask can drain off.

In addition to solving the problems of the prior art gas masks, the present invention also provides a number of special advantages.

First, such an accessory can be made in such a way that no loose parts are needed that might get lost.

An important advantage of the accessory of the invention is that the received liquid by the use of the straw does not come into contact with the accessory itself, so that the latter is not soiled and cannot get clogged, not even by viscous or sugared liquids.

Other advantages are that no complicated accessories are needed and that, at least according to the preferred embodiment, a double safety seal is used.

Accordingly, such an accessory for gas masks following the invention consists mainly of the combination of means being able to connect the inside of the gas mask with the outside environment, a sealing element that can co-operate with said means, said sealing element in a first position providing the sealing of the connection and in a second position providing the free passage of it in order to allow the supply of food and/or the drainage or perspiration, and means to maintain said sealing element in its first position.

Preferably the abovesaid means that are able to connect the inside of the gas mask with the outside environment consist of a housing provided with a through channel, whereas the said sealing element consists of a slide that can shut off the through channel. The means for maintaining the sealing element in its first position preferably consist of resilient means such as e.g. a compression spring, that force the slide in its closed position.

In order to better indicate the characteristics of the present invention, an embodiment of the accessory as well as the design of a gas mask provided with such an accessory are described below by way of an example without any limiting character with reference to the accompanying drawings wherein:

FIG. 1 represents a section of the accessory for gas masks according to the invention;

FIG. 2 represents a view of a section according to line II—II in FIG. 1;

Figures 3, 4:
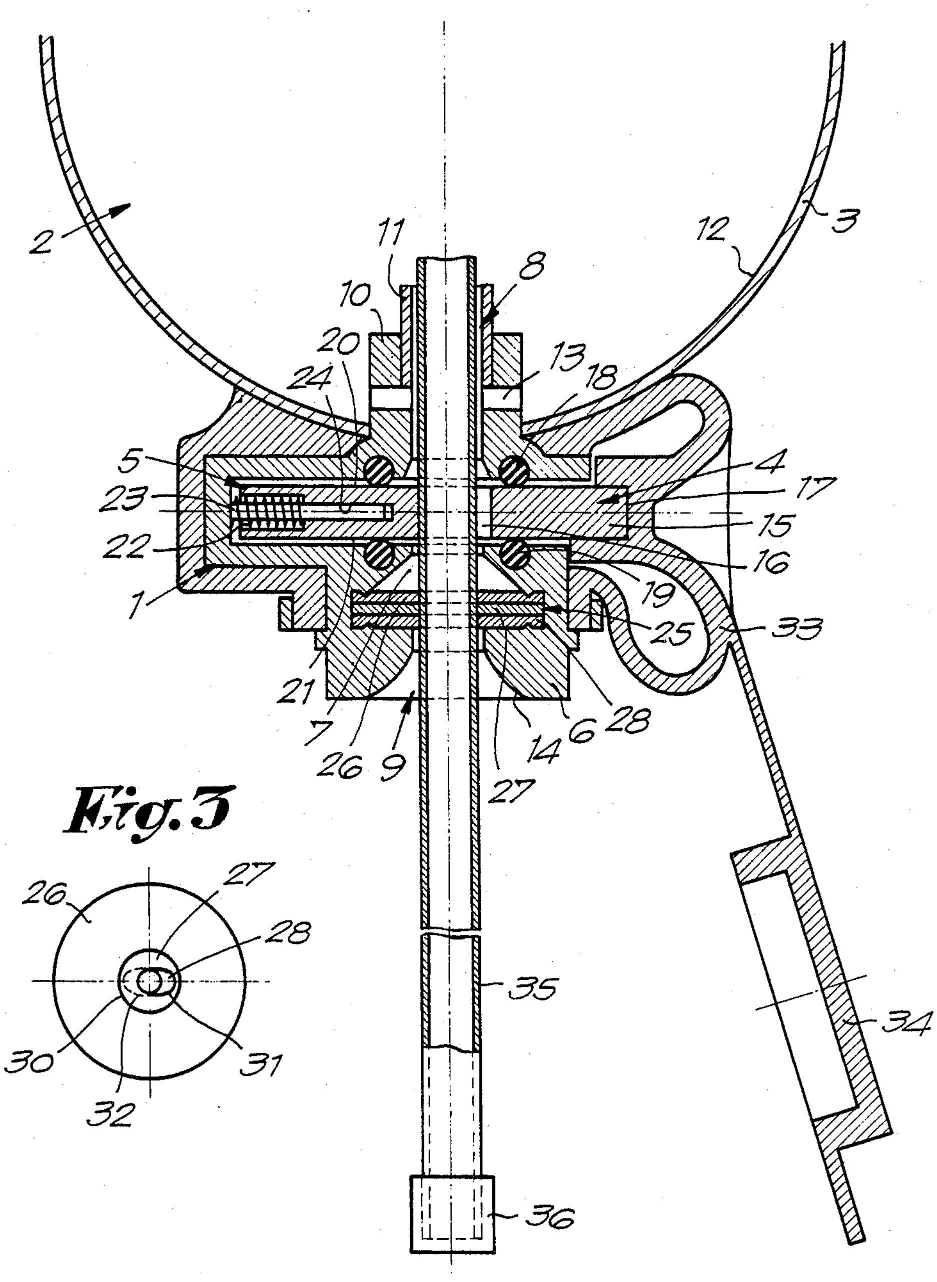
FIG. 3 represents a top view of the sealing in accordance with the invention.
FIG. 4 represents the accessory of FIG. 1 during the use of it for taking food.

As represented in FIGS. 1 and 2 the gas-mask accessory according to the invention mainly consists of means 1 that are able to connect the inside 2 of a gas mask 3 with the outside environment of the gas mask, a sealing element 4, and means 5 for maintaining said sealing element in a well-defined position.

The means 1 that are able to connect the inside 2 of the gas mask 3 with the outside environment, in the represented embodiment are mainly formed by a housing 6 with a through channel 7, which with its upper end 8 opens into the inside 2 of the gas mask 3, whereas its lower end 9 is directed to the outside environment or atmosphere.

At its upper end 8 the through channel 7 preferably reaches over a certain distance up to the inside 2 of the gas mask 3 so that a collar or extension 10 is formed, that is intended for connecting a flexible hollow conduit 11. Near the inner wall 12 said extension 10 is provided with perspirationdraining openings 13.

The through channel 7 is provided with a conical access 14 near its lower end 9.

Sealing element 4 consists of a flat slide 15 comprising an opening 16. Said slide 15 is mounted in the housing 6 in such a way that it extends perpendicularly through the through channel 7. In a first position as represented in FIGS. 1 and 2, said slide 15 shuts off channel 7. According to a second position of slide 15, opening 16 is in the extension of channel 7 so that a free passage is formed thereby. Preferably, slide 15 is mounted in the housing 6 in such a way that said first and second positions constitute the respective extreme positions. In order to provide the operation of said slide 15, one end 17 reaches as far as outside said housing 6.

Between housing 6 and slide 15, particularly around the through channel 7, sealing rings 18 and 19 are applied. Preferably, said rings are O-ring seals made of rubber that fit on the flat upside 20 and underside 21 respectively of slide 15.

The means 5 for maintaining sealing element 4 in its first position are mainly formed by a resilient element such as a compression spring 22. This compression spring 22 is mounted between housing 6 and slide 15 by means of the necessary guides 23 and 24 in such a way that slide 15 is always brought back to its first position. Preferably, a compression spring 22 of such a length is chosen that it is completely unloaded in the first position of slide 15.

Further, in the lower end 9 of through channel 7 a sealing 25 is applied whose purpose will be explained below. This sealing 25 consists of three elastic disks 26, 27 and 28, which have a passage 29 according to the axis of through channel 7. This passage 29 is formed by openings 30, 31 and 32 in the disks 26, 27 and 28 respectively. As represented in FIG. 3, the opening 30 is circular. Openings 31 and 32 overlap each other partly and are completely within the circular periphery of opening 30.

As represented in FIGS. 1 and 2, the gas-mask accessory according to the present invention is provided with an elastic envelope 33. This envelope 33 serves a sealing and a fitting function on the mask 3 proper, and as an additional sealing protection of the housing 6 and the slide 15.

Finally, through channel 7 can be sealed by a lid 34. This lid 34 is preferably made of one piece together with the elastic envelope 33.

Said sealing 25 as well as the envelope 33 and the lid 34 are made of rubber.

The operation and the use of the above-described gas-mask accessory will now be explained by means of FIGS. 1 and 4.

The gas mask 3 with an accessroy according to the present invention is supplied with a number of staws 35, that are preferably packed in a suitable foil. Such straws 35 possess a well-determined strength and at one end are provided with a removable small cap 36 as represented in FIG. 4.

While no food is being taken up, the accessory remains in a position of rest as represented in FIG. 1. While food is being taken up from a food receptacle, the person wearing the gas mask 3 strips the protective foil from a straw 35, opens the lid 34 of the accessory and brings the straw 35 via the conical access 14 into the lower end 9 of through channel 7. Cap 36 is then at the underside of said straw 35. Thereupon, straw 35 is forced through sealing 25. The diameter of said straw 35 and the size of the openings 30 through 32 of the disks 26 through 28 are chosen such that said opening 30 just fits around said straw 35, while the openings 31 and 32 are being forced open resiliently.

Straw 35 is pressed against slide 15. At that moment the person wearing mask 3 operates slide 15 and pushes the straw 35 through the opening 15 and the flexible guide 11 up to the mouth. The supplied straws 35 being sufficiently stiff, slide 15 can be released whereby a situation is obtained as represented in FIG. 4.

When the food receptacle is ready, cap 36 is blown off straw 35 and this straw 35 is dipped in the liquid contained in the food receptacle.

After the food or the beverage has been taken up from the food receptacle, said straw 35 is simply withdrawn from the accessory of the invention, whereby slide 15 closes automatically, whereupon lid 34 is closed again.

If the user has no more special straws 35, he can also make do with the well-known straws on the market. These straws may have a smaller diameter than the abovesaid straws 35, but this is no problem since the disks 27 and 28 of sealing 25, because of the smaller openings 31 and 32 made therein, still provide a complete sealing.

Upon using common straws one should constantly press on slide 15, because such straw cannot withstand the pressure of compression spring 22. Moreover, one should blow through the straw in order to eliminate polluted air before dipping the straw into a liquid receptacle.

Perspiration of the person wearing gas mask 3 flows as far as slide 15 via the aforesaid perspiration-draining openings 13. By opening lid 34, operating slide 15 and breathing out simultaneously, one can efficiently eliminate the perspiration. Of course such action has to be carried out before every intake of food at least.

Figures 5, 6:
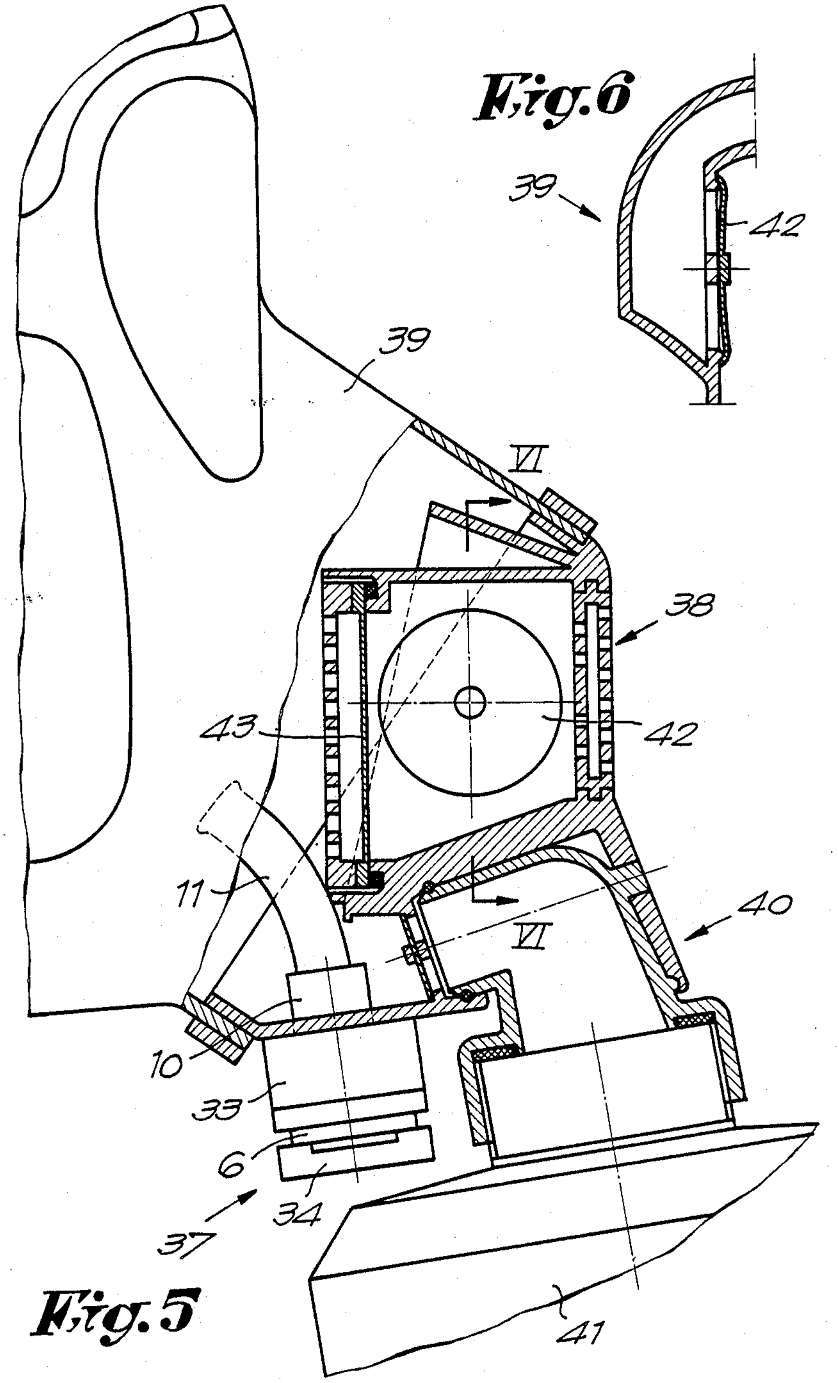
FIG. 5 represents a gas mask that is equipped with the accessory according to the invention.
FIG. 6 represents a partial section according to line VI—VI in FIG. 5.

The invention also relates to gas masks 3 that are equipped with an accessory for the supply of food and/or for the drainage of perspiration. In FIG. 5 such a gas mask 3 is represented wherein the accessory is generally indicated with reference number 37. Said gas mask 3 consists mainly of an intake and exhaust piece 38 and fixing means therefor, such as e.g. a face mask 39. By way of illustration the filter-connecting piece 40, a filter 41, an exhalation valve 42 and a speaking membrane 43 are indicated in FIG. 5.

A special preferred embodiment of the gas mask according to the invention is obtained as represented in FIG. 5, by combining a tiltable filter-connecting piece 40 with an accessory 37 that is placed behind said filter-connecting piece 40. Accessory 37 then finds itself in a very advantageous place and can be reached without effort by tilting aside said filter-connecting piece 40 and the filter 41 placed on top of it.

The present invention is by no means limited to the exemplified embodiments represented in the accompanying drawings, but such gas-mask accessory as well as the gas masks equipped therewith but can be realized in any form or shape without departing from the scope of the invention.

I claim:

1. An accessory for a gas mask comprising a port member having a channel allowing communication between the space inside said gas mask and the environment outside said gas mask, said port member having a slidable sealing element arranged outside said gas mask and movable between a first position to open said channel and a second position to close said channel, said channel being defined in part by a collar which extends inwardly from said gas mask, the wall of said collar having opening means passing therethrough, said channel communicating with the lowest portion of said space inside said gas mask by way of said opening means for draining moisture from said space to said environment by way of said channel.

2. The accessory as defined in claim 1, further comprising a flexible hollow tube having an end mounted in said collar.

3. A gas mask equipped with an accessory comprising a port member having a channel allowing communication between the space inside said gas mask and the environment outside said gas mask, said port member having a slidable sealing element arranged outside said gas mask and movable between a first position to open said channel and a second position to close said channel, said channel being defined in part by a collar which extends inwardly from said gas mask, the wall of said collar having opening means passing therethrough, said channel communicating with the lowest portion of said space inside said gas mask by way of said opening means for draining moisture from said space to said environment by way of said channel.

4. The gas mask of claim 3 including a tiltable connecting piece adapted to accommodate said accessory behind a filter of said gas mask.

5. An accessory for a gas mask comprising:

a housing coupled to said gas mask and having first and second channel means;

a slidable sealing element slidably arranged inside said housing and slidable between a first position and a second position, said slidable sealing element having an opening which allows communication between said first and secnd channel means when said slidable sealing element is in said first position and which blocks communication between said first and second channel means when said slidable sealing element is in said second position;

spring means coupled to said slidable sealing element for urging said slidable sealing element toward said second position; and an elastic envelope fixedly coupled to said housing and to one end of said slidable sealing element, said elastic envelope comprising a flexible cover which is movable into engagement with said housing, said flexible cover closing an end of said second channel means when in engagement with said housing whereby the space inside said gas mask is sealed off from the environment outside said gas mask.

6. The accessory as defined in claim 5, further comprising first and second sealing means mounted in said housing, each of said first and second sealing means having an opening therethrough, said first and second sealing means being arranged whereby said opening of said second sealing means, said openings of said first and second sealing means forming part of said second channel means.

7. The accessory as defined in claim 6, further comprising third sealing means mounted in said housing, said third sealing means having an opening therethrough, said third sealing means being arranged whereby said opening of said third sealing means completely overlaps said openings of said first and second sealing means, said opening of said third sealing means forming part of said second channel means.

8. An accessory for a gas mask comprising:

a housing coupled to said gas mask and having first and second channel means;

a slidable sealing element slidably arranged inside said housing and slidable between a first position and a second position, said slidable sealing element having an opening which allows communication between said first and second channel means when said slidable sealing element is in said first position and which blocks communication between said first and second channel means when said slidable sealing element is in said second position;

spring means coupled to said slidable sealing element for urging said slidable sealing element toward said second position; and first and second flexible sealing means mounted in said housing, each of said first and second sealing means having an opening therethrough, said first and second sealing means being arranged whereby said opening of said first sealing means partially overlaps said opening of said second sealing means, said openings of said first and second sealing means forming part of said second channel means, and third flexible sealing means mounted in said housing, said third sealing means having an opening therethrough, said third sealing means being arranged whereby said opening of said third sealing means completely overlaps said openings of said first and second sealing means, said opening of said third sealing means forming part of said second channel means.

* * * * *